3,050,503
CHLOROSULFONATED ELASTOMERS AND
METHODS FOR MAKING THE SAME
Giulio Natta, Mario Bruzzone, and Carlo Borsini, Milan, Italy, assignors to Montecatini, Società Generale per l'Industria Mineraria e Chimica, Milan, Italy
Filed Apr. 9, 1957, Ser. No. 651,785
Claims priority, application Italy Apr. 20, 1956
14 Claims. (Cl. 260—79.3)

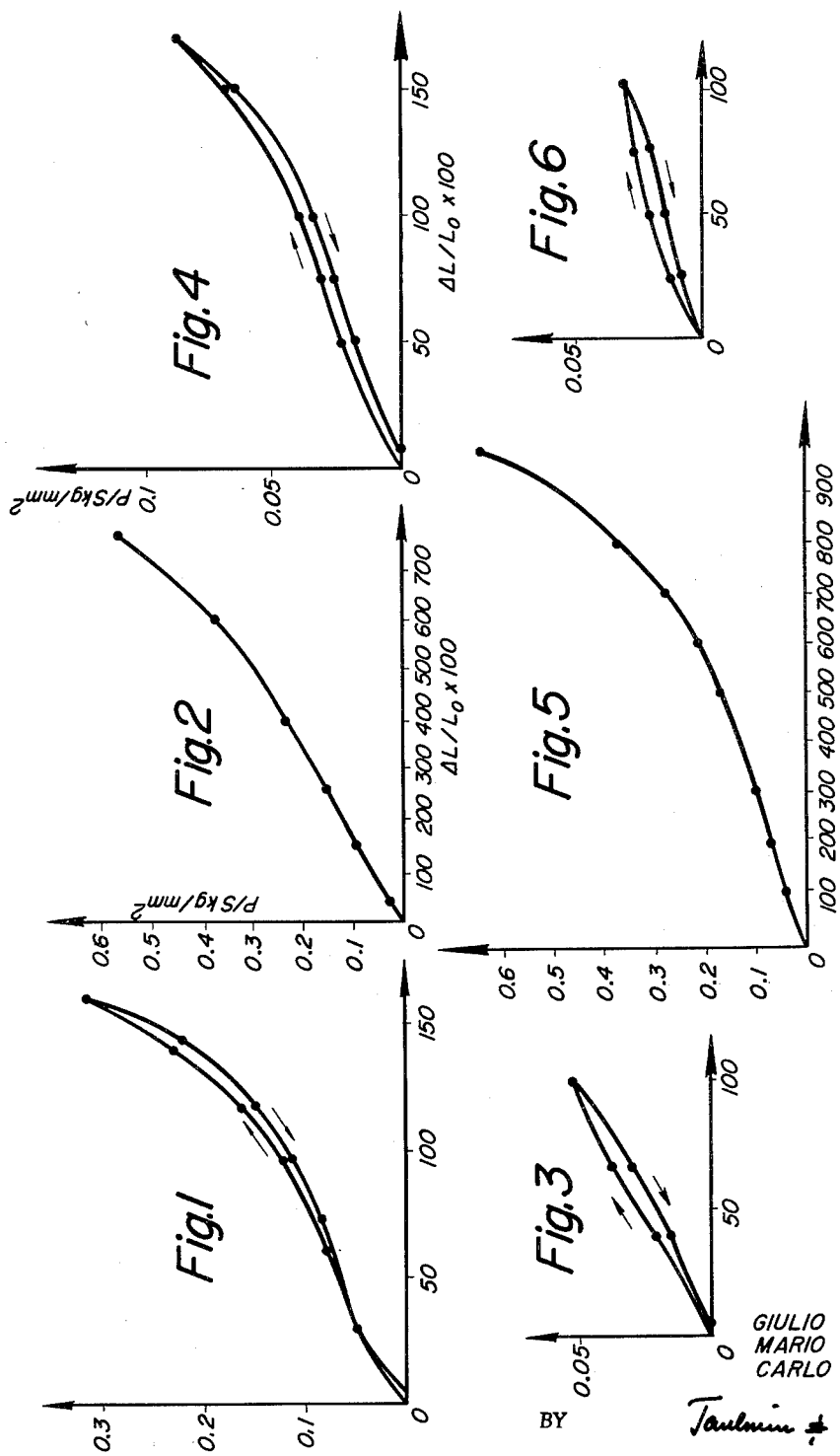

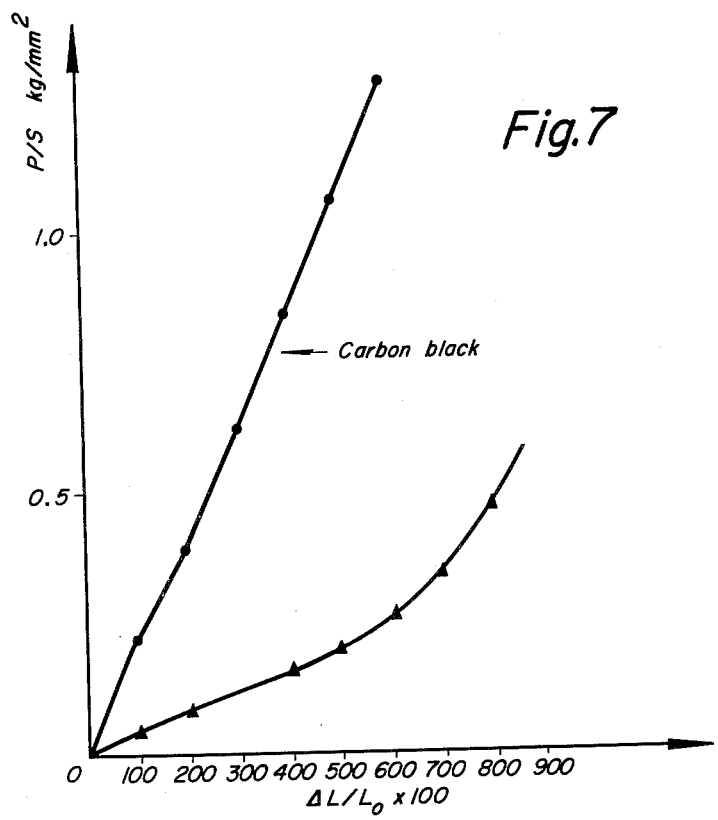

This invention relates to elastomers having improved elastic properties, and to methods of preparing the new elastomers. More particularly, the invention relates to elastomeric polymers of alpha olefines higher than propylene and specifically of alpha olefines containing from 4 to 6 carbon atoms.

Linear, substantially amorphous, head-to-tail high polymers of the alpha-olefines are disclosed in the pending applications of G. Natta et al.; Ser. Nos. 514,095, 514,098, and 514,099, all filed June 8, 1955.

Elastomers can be obtained from saturated polymers of ethylene and propylene by introducing groups such as the chlorosulfonic group ($SO_2Cl$) into the polymer, whereby the latter are rendered vulcanizable and then subjecting the modified polymers to vulcanizing conditions. In the case of polyethylene, it is necessary to introduce a high percentage of chlorine, above 20%, into the polymer, in addition to the chlorine contained in the chlorosulfonic groups, in order to render the polymer amorphous and rubberlike. The resulting vulcanized elastomer has the disadvantages that it is undesirably rigid and exhibits unsatisfactory elastic behaviour.

It has been disclosed that elastomers having improved elastic properties as compared to those obtainable from polyethylene can be obtained by the chlorosulfonation of substantially amorphous, linear, head-to-tail propylene polymers of the type disclosed in the copending applications supra.

We have now found that, unexpectedly, elastomers having elastic properties and in particular an impact resilience remarkably better than those obtainable from either the vulcanized chlorosulfonated ethylene or vulcanized amorphous chlorosulfonated propylene polymers, can be obtained by the chlorosulfonation and subsequent vulcanization of linear, regular head-to-tail high polymers of the alpha-olefines containing 4 to 6 carbon atoms.

The elastomers we have obtained by chlorosulfonating the linear high polymers of the higher alpha-olefines and then vulcanizing the chlorosulfonated polymers exhibit a decrease of the secant modulus at low elongation with increase in the length of the side chain, the chlorine and sulfur contents being constant. This can be attributed to an internal plasticizing of the polymer resulting from the presence of the side chain, which internal plasticization is more pronounced the longer the side chain. The influence of the side chain is also demonstrated, for instance, by the fact that the second order transition temperature of the polymers obtained from the various members of the linear alpha-olefine series decreases from one member of the series to the next higher member of the series. Thus the second order transition temperature of the linear polypropylenes is higher than for the linear poly-alpha-butenes.

We find, also, that the elastomers obtained from the linear high polymers of the alpha-olefines exhibit improved characteristics as compared to elastomers obtained in the same manner from polymers produced according to the known cationic polymerization processes. Apparently, the superiority of the elastomers obtained from the amorphous, linear high polymers can be attributed to the fact that, the molecular weights being equal, the polymers obtained by cationic polymerization of the monomers contain shorter chains and are inherently less flexible because of the presence of branched chains.

The linear high polymers of the alpha-olefines are obtained, as set forth in the above-mentioned pending applications, by polymerizing the monomer in an inert hydrocarbon solvent with the aid of a catalyst obtained from a compound of a transition metal of groups IV to VI of the periodic table and an organometallic compound of a metal of the 1st to 3rd groups of the periodic table.

The polymers thus produced have a substantially linear, regular head-to-tail structure. The crude polymerizate usually comprises a mixture of amorphous and crystalline polymers which can be separated by successive extractions with boiling solvents, into amorphous, partially crystalline and highly crystalline polymers.

The amorphous fractions of the polymers are in general more suitable than the crude polymerizate for the production of the present elastomers.

With poly-hexene however the crude polymerizate can be used as such, without the need of fractionation.

The partially crystalline and highly crystalline portions of the crude polymerizate can also be converted to elastomers provided a relatively high percentage of chlorine, e.g. 10% to 20% is introduced and, as a consequence, the crystallinity of the polymer is reduced.

We also find, in the case of the polymers of the alpha-olefine higher than propylene, that the elastic properties of the elastomers obtained by vulcanizing chlorosulfonated polymers are reduced by the presence of polar groups in the chain of the polymers. For the best elastic properties, therefore, it is necessary to limit the proportion of Cl atoms, which are less effective vulcanizing aids than $SO_2Cl$ groups, and to restrict the $SO_2Cl$ content to not much more than the amount required for good vulcanization of the polymer. There is a relationship between the molecular weight of the polymeric higher alpha-olefine and the $SO_2Cl$ content required for good vulcanization thereof, the higher the molecular weight of the polymer the lower the $SO_2Cl$ content required for the vulcanization.

In general, the amorphous linear polymers of the alpha-olefines higher than propylene which are chlorosulfonated in accordance with this invention may have molecular weights corresponding to intrinsic viscosities, in tetrahydronaphthalene at 135° C., $$[\mu] = 0.4 \times 10^2 \text{ cm.}^3/\text{g. to } 4.0 \times 10^2 \text{ cm.}^3/\text{g.}$$

and the chlorosulfonated polymers may have a chlorine content of 1% to 10% and a sulfur content of 0.3% to 3%.

Those chlorosulfonated amorphous polymers having a high molecular weight, i.e., those having intrinsic viscosity, in tetralin at 135° C., $$[\mu] = 1.2 \times 10^2 \text{ cm.}^3/\text{g. to } 3.8 \times 10^2 \text{ cm.}^3/\text{g.}$$

and a low content of S and Cl atoms, e.g., a sulfur content of 0.5% to 2%, and a chlorine content of 1% to 6%, have the best elastic properties. Such chlorosulfonated polymers can be obtained from starting substantially amorphous polymers of the alpha-olefines higher than propylene having intrinsic viscosity, in tetrahydronaphthalene at 135° C., $$[\mu] = 1.5 \times 10^2 \text{ cm.}^3/\text{g. to } 4 \times 10^2 \text{ cm.}^3/\text{g.}$$

Illustratively, when an amorphous, linear poly-alpha-hexene having an intrinsic viscosity of $1.44 \times 10^2$ cm.³/g. is chlorosulfonated in accordance with this invention to a chlorine content of 2.5% and a sulfur content of 0.75%, and then vulcanized with a metal oxide, the resulting elastomer is found to have an impact resilience (rebound) above 35%.

A comparison of the elastomers obtained from the different chlorosulfonated linear alpha-olefine polymers shows that the longer the side chains of the polymer, the less pronounced is the influence of the polar groups (e.g. Cl) on the modulus and on the impact resilience of the elastomer. Thus, with chlorosulfonated and vulcanized amorphous poly-butene marked modulus variations are observed with increase in the chlorine content up to about 10%, while no such marked modulus variations are observed in the case of the elastomers obtained from amorphous poly-hexene.

In general, during the chlorosulfonation, the polymeric alpha-olefines are degraded to an extent which can be determined viscosimetrically, and which is found to decrease from polypropylene to poly-alpha-butene to poly-alpha-hexene, for equal total contents of sulfur and chlorine.

This means that chlorosulfonated derivatives of the polymers of the alpha-olefines higher than propylene and having a high molecular weight can be obtained and yield, on vulcanization, elastomers having good elastic behaviour, an acceptably high ultimate strength, and a high ultimate elongation.

The chlorosulfonic groups can be introduced into the amorphous linear alpha-olefine polymers by any suitable method. Generally, the chlorosulfonation is effected by either of the following methods:

(a) By reacting the polymer, in solution, in a chlorinated solvent therefor such as carbon tetrachloride, with gaseous $Cl_2$ and $SO_2$, e.g. in a molar ratio of 1:3. An excess of $SO_2$ favors the chlorosulfonation reaction over the competitive chlorination reaction;

(b) By reacting the polymer, in solution in a chlorinated solvent, e.g., in carbon tetrachloride, with $SO_2Cl_2$ in the presence of a small amount (e.g. from 0.3% to 3% on the weight of the polymer) of a catalyst such as a pyridine base.

Method (b) is usually preferred since it affords better control of the chlorosulfonation reaction especially when it is desired to introduce small proportions of sulfur and chlorine into the polymer. Also with method (b) it is possible to carry out the chlorosulfonation even in highly concentrated solutions of the polymer, e.g., in solutions of from 5% to 20% concentration, and in which degradation of the polymer is minimized.

Vulcanization of the chlorosulfonated polymers is due to the formation of cross-links which occurs when the chlorosulfonated polymers are subjected to heat, especially when the heating is performed in the presence of hydrogen chloride acceptors such as lead oxide, primary, secondary and tertiary mono- and poly-amines, diamides such as urea and thiourea, and of suitable accelerators.

The compounding ingredients usual in the preparation of elastomers, such as fillers, reinforcing agents, vulcanization accelerators, anti-oxidants, pigments, etc. may be incorporated in the chlorosulfonated polymers prior to the vulcanization thereof, in the usual amounts. Included are various metal oxides; accelerators like diphenyl guanidine, piperidine pentamethylene dithiocarbamate, mercaptobenzothiazoles, and tetramethyl-thiuram; antioxidants such as "Antox" (condensation product of butyraldehyde-aniline), "Santiflex B" (reaction product of acetone and p-aminodiphenyl), and "Agerite Alba" (p-benzyloxy-phenol); lubricants like stearic acid, "Seriate" (a type of muscovite) etc.

The chlorosulfonated polymers mixed with suitable vulcanizing accelerators and so on may be ground to a fine state of subdivision to obtain a molding powder. Fillers, for example cellulosic fillers such as wood pulp or wood flour, as well as other suitable fillers, e.g., asbestos fibers, mineral wool, glass fibers and mineral pigments, may be milled with the polymer in preparing the molding powder.

In the accompanying drawing,

FIGURE 1 shows the tensile hysteresis cycle at low testing rate (25 mm./min.) by 160% strain, carried out on a pre-stretched specimen of the chlorosulfonated and vulcanized poly-alpha-butene of Example 2;

FIGURE 2 is the stress/strain diagram for the chlorosulfonated and vulcanized poly-alpha-hexene of Example 5 (testing rate 25 mm./min.);

FIGURE 3 is the tensile hysteresis cycle, at low testing rate (25 mm./min.) by 100% strain, carried out on a non-stretched specimen of the chlorosulfonated and vulcanized polymer of Example 5;

FIGURE 4 illustrates the tensile hysteresis cycle at low testing rate (25 mm./min.) by 200% strain, carried out on a pre-stretched specimen of the chlorosulfonated and vulcanized poly-alpha-hexene of Example 5;

FIGURE 5 is the stress/strain diagram of the chlorosulfonated and vulcanized poly-alpha-hexene of Example 7 (testing rate 25 mm./min.);

FIGURE 6 shows the testing hysteresis cycle at low testing rate (25 mm./min.) by 100% strain, carried out on the chlorosulfonated and vulcanized poly-alpha-hexene of Example 7;

FIGURE 7 shows the influence of the presence of carbon black MPC on the stress/strain curve for the chlorosulfonated and vulcanized poly-alpha-hexene of Example 5.

The following examples are given to illustrate the invention, it being understood that these examples are not intended to be limiting. In the examples, the intrinsic viscosity of the starting polymer was determined in tetrahydronaphthalene at 135° C. and the intrinsic viscosity of the chlorosulfonated polymer was determined in tetralin at 135° C.

*Example 1*

Ten g. amorphous poly-alpha-butene (intrinsic viscosity $[\mu]'=1.5\times 10^2$ cm.$^3$/g.) are dissolved in 200 ml. carbon tetrachloride. The solution is maintained at 50° C., at which temperature the polymer is chlorosulfonated by adding dropwise 1.3 ml. of $SO_2Cl_2$ to the solution. 0.08 ml. pyridine are added as catalyst, and the solution is irradiated by a 200 w. filament lamp. The reaction is stopped after two hours and the chlorosulfonated polymer is precipitated by pouring the solution into an excess of methanol. The chlorosulfonated polymer is dried at 65° C. under vacuum. It contains 3.3% chlorine, 1.0% sulfur, and has an intrinsic viscosity $[\mu]'=0.66\times 10^2$ cm.$^3$/g.

*Example 2*

100 parts by weight of the chlorosulfonated poly-alpha-butene of Example 1 are mixed for 10 to 20 minutes with the following ingredients:

| | Parts by weight |
|---|---|
| Lead oxide | 40 |
| 2-mercaptobenzothiazole | 2 |
| Colophony | 5 |
| Anti-oxidant | 1 | in a roll mixer having rolls of 50 mm. diameter which are kept at 30° C. The mixture is then vulcanized for 30 minutes in closed molds in a press, at a temperature of 150° C. and under a pressure of about 50 kg./cm.$^2$.

The sheet thus obtained has an average thickness of about 0.9 mm. From it, specimens type D according to ASTM D-412-51T are prepared by means of a standard hollow punch. The specimens have the following characteristics:

| | |
|---|---|
| Ultimate tensile strength _____kg./mm.$^2$ | 0.89 |
| Elongation at break _____percent | 635 |
| Modulus at 200% elongation _____kg./mm.$^2$ | 0.32 |

The determinations were made by means of an Amsler machine with horizontal traction and low testing rate (25 mm./min.) at an average temperature of about 15° C.

A pre-stretched specimen was subjected to a mechanical stress and release cycle with a maximum stress of 0.313 kg./cm.$^2$, referred to the initial cross-sectional area. The hysteresis cycle obtained is shown in FIGURE 1 of the accompanying drawing.

*Example 3*

Ten g. amorphous poly-alpha-butene (intrinsic viscosity $[\mu]=0.55\times10^2$ cm.$^3$/g.) are dissolved in 200 ml. of carbon tetrachloride and chlorosulfonated by adding, over a period of one hour, 1.5 ml. SO$_2$Cl$_2$ to the solution heated at 50° C. The chlorosulfonation reaction is catalyzed by adding 0.15 ml. of pyridine to the solution. After two hours, the reaction is stopped, the polymer is precipitated by pouring the solution into an excess of methanol, and the chlorosulfonated polymer is dried under vacuum. It contains 5% chlorine and 1.6% sulfur. The intrinsic viscosity is now $[\mu]=0.4\times10^2$ cm.$^3$/g.

*Example 4*

10 g. amorphous poly-alpha-hexene (intrinsic viscosity $[\mu]=2.23\times10^2$ cm.$^3$/g.) are dissolved in 200 ml. carbon tetrachloride. The solution is maintained at 50° C. and the polymer is chlorosulfonated by adding slowly to the heated solution 1.25 ml. SO$_2$Cl$_2$. Pyridine (0.075 ml.) is added as catalyst. The reaction is stopped after two hours and the chlorosulfonated poly-alpha-hexene is precipitated by pouring the solution into an excess of methanol. The polymer is then dried at 65° C. under vacuum. The chlorosulfonated polymer contains 2.5% chlorine, 0.75% sulfur, and has an intrinsic viscosity $[\mu]=1.44\times10^2$ cm.$^3$/g.

*Example 5*

100 parts by weight of the chlorosulfonated polymeric alpha-hexene of Example 4 are mixed with:

| | Parts by weight |
|---|---|
| Lead oxide | 40 |
| 2-mercaptobenzothiazole | 2 |
| Colophony | 5 | in a roll type mixer and under the same conditions as set forth in Example 2. The mixture is vulcanized in a press, in closed molds, at 140° C. for 45 minutes and under a pressure of about 50 kg./cm.$^2$ The vulcanized product, when tested according to the procedures described in Example 2, has the following characteristics:

| | | |
|---|---|---|
| Ultimate tensile strength | kg./mm.$^2$ | 0.56 |
| Elongation at break | percent | 760 |
| Modulus at 200% elongation | kg./mm.$^2$ | 0.10 |

The stress/strain curve for the molded specimens is shown in FIGURE 2 of the drawing, FIGURES 3 and 4 of which show the extent of reversibility of the elongation.

*Example 6*

10 g. amorphous poly-alpha-hexene (intrinsic viscosity $[\mu]=3.66\times10^2$ cm.$^3$/g.) are dissolved in 200 ml. carbon tetrachloride. The solution is maintained at 50° C. The polymer is chlorosulfonated by adding dropwise to the solution 1.0 ml. SO$_2$Cl$_2$ in the presence of 0.075 ml. pyridine and under irradiation by a 200-w. filament lamp. After two hours the reaction is stopped and the solution is poured into an excess of methanol to precipitate the chlorosulfonated polymeric alpha-hexene. The polymer is then dried at 65° C. under vacuum. It contains 7% chlorine, 0.4% sulfur, and has an intrinsic viscosity $[\mu]=3.65\times10^2$ cm.$^3$/g.

*Example 7*

100 parts of the chlorosulfonated poly-alpha-hexene of Example 6 are mixed with

| | Parts by weight |
|---|---|
| Lead oxide | 40 |
| 2-mercaptobenzothiazole | 2 |
| Colophony | 5 |
| Anti-oxidant | 1 |

The mixture is vulcanized in a press, in closed molds, at 150° C. for 30 minutes, under a pressure of about 50 kg./cm.$^2$ The vulcanized product has the properties listed below:

| | | |
|---|---|---|
| Ultimate tensile strength | kg./mm.$^2$ | 0.64 |
| Elongation at break | percent | 990 |
| Modulus at 200% elongation | kg./mm.$^2$ | 0.06 |

*Example 8*

10 g. amorphous poly-alpha-hexene (intrinsic viscosity $[\mu]=3.66\times10^2$ cm.$^3$/g.) and containing 0.1 g. octylphenol as anti-oxidant are dissolved in 200 ml. carbon tetrachloride. The solution is maintained at 50° C., and the polymer is chlorosulfonated by adding dropwise to the solution 1.8 ml. SO$_2$Cl$_2$. Pyridine (0.19 ml.) is added as catalyst and the solution is irradiated by a 200-w. filament lamp. The reaction is stopped after two hours and the solution is poured into an excess of methanol to precipitate the chlorosulfonated poly-alpha-hexene, which is dried at 65° C. under vacuum and found to contain 10.9% chlorine, 0.5% sulfur, and to have an intrinsic viscosity $[\mu]=2.80\times10^2$ cm.$^3$/g.

*Example 9*

100 parts by weight of the chlorosulfonated poly-alpha-hexene of Example 8 are mixed with

| | Parts by weight |
|---|---|
| Lead oxide | 40 |
| 2-mercaptobenzothiazole | 2 |
| Colophony | 5 |
| Anti-oxidant | 1 |

The mixture is vulcanized in a press, in closed molds, at 150° C. for 30 minutes, under a pressure of about 50 kg./cm.$^2$. The vulcanized product has the following properties:

| | | |
|---|---|---|
| Ultimate tensile strength | kg./mm.$^2$ | 0.6 |
| Elongation at break | percent | 865 |
| Modulus at 200% elongation | kg./mm.$^2$ | 0.10 |

*Example 10*

100 parts by weight of the chlorinated poly-alpha-hexene of Example 8, are mixed with

| | Parts by weight |
|---|---|
| Lead oxide | 40 |
| 2-mercaptobenzothiazole | 2 |
| Colophony | 5 |
| Carbon black MPC | 40 |
| Anti-oxidant | 1 |

The mixture is vulcanized in a press in closed molds under a pressure of about 50 kg./cm.$^2$ and at a temperature of 150° C. for 30 minutes, to obtain vulcanized products having these properties:

| | | |
|---|---|---|
| Ultimate tensile strength | kg./mm.$^2$ | 1.31 |
| Elongation at break | percent | 590 |
| Modulus at 200% elongation | kg./mm.$^2$ | 0.40 |

The stress/strain curve for the vulcanized elastomer loaded or reinforced with carbon black is shown in FIGURE 7 of the accompanying drawing. FIGURE 8 of the drawing shows the stress/strain curve for the vulcanized product of Example 9.

Example 11

10 g. amorphous poly-alpha-hexene (intrinsic viscosity $[\mu]=2.23\times10^2$ cm.$^3$/g.) are dissolved in 200 ml. carbon tetrachloride, the solution is held at 50° C., and the polymer is chlorosulfonated by adding 2 ml. SO$_2$Cl$_2$ dropwise to the solution. Pyridine (0.2 ml.) is added as catalyst and the solution is irradiated by a 200-w. filament lamp. After an hour and 15 minutes the reaction is stopped and the polymer is coagulated by pouring the solution into an excess of methanol. The chlorosulfonated poly-alpha-hexene is then dried at 65° C. under vacuum. It contains 6.65% chlorine, 2.51% sulfur, and has intrinsic viscosity $[\mu]=1.35\times10^2$ cm.$^3$/g.

Example 12

100 parts by weight of the chlorosulfonated poly-alpha-hexene of Example 11 are mixed with:

| | Parts by weight |
|---|---|
| Lead oxide | 40 |
| 2-mercaptobenzothiazole | 2 |
| Colophony | 5 |

This mixture is vulcanized in a press, in closed molds, under a pressure of 50 kg./cm.$^2$ and at a temperature of 150° C. for 30 minutes. The vulcanized product has the characteristics given below:

| | |
|---|---|
| Ultimate tensile strength ___kg./mm.$^2$__ | 0.33 |
| Elongation at break ___percent__ | 480 |
| Modulus at 200% elongation ___kg./mm.$^2$__ | 0.12 |

Example 13

10 g. partially crystalline, poly-alpha-pentene (intrinsic viscosity of $1.25\times10^2$ cm.$^3$/g.) are dissolved in 200 ml. CCl$_4$, the solution is kept at 50° C. and chlorosulphonated by adding 1.3 ml. SO$_2$Cl$_2$ dropwise into the reaction vessel. 0.12 ml. pyridine are added as catalyst and the solution is irradiated by a 200 w. filament lamp. After 2 hours a stream of gaseous chlorine (0.5 liter/hour) is passed for 30 minutes through the solution. The reaction is then stopped and the polymer is coagulated by pouring the solution in an excess of methanol. The chlorosulfonated polymer is dried at 65° C. under vacuum. It contains 1% S and 12% Cl.

Example 14

100 parts by weight of the chlorosulfonated polymer of Example 13 are mixed with:

| | Parts by weight |
|---|---|
| Lead oxide | 40 |
| 2-mercaptobenzothiazole | 2 |
| Colophony | 5 |

The mixture is vulcanized under a press in closed molds at 150° C. for 30 minutes, at a pressure of 50 kg./cm.$^2$. The vulcanized product shows:

| | |
|---|---|
| Ultimate tensile strength ___kg./mm.$^2$__ | 1.55 |
| Elongation at break ___percent__ | 675 |
| Modulus at 200% elongation ___kg./mm.$^2$__ | 0.3 |

Example 15

10 g. crystalline poly-alpha-butene (intrinsic viscosity of $2.51\times10^2$ cm./$^3$g.) are dissolved in 200 ml. CCl$_4$, the solution is kept at 50° C. and chlorosulfonated by adding 1.6 ml. SO$_2$Cl$_2$ dropwise into the reaction vessel 0.16 ml. pyridine are added as catalyst and the solution is irradiated by a 200 w. filament lamp for 30 minutes. A stream of gaseous chlorine (1.0 liter/hour) is then passed for 1 hour through the solution. The reaction is then stopped and the polymer is coagulated by pouring the solution in an excess of methanol. The chlorosulfonated polymer is dried at 65° C. under vacuum. It contains 2.1% S and 17% Cl.

Example 16

100 parts by weight of the chlorosulphonated polymer of Example 15 are mixed with:

| | Parts by weight |
|---|---|
| Lead oxide | 40 |
| 2-mercaptobenzothiazole | 2 |
| Colophony | 5 |

The mixture is vulcanized under a press in closed molds at 150° C. for 30 minutes, at a pressure of 50 kg./cm.$^2$. The vulcanised product shows:

| | |
|---|---|
| Ultimate tensile strength ___kg./mm.$^2$__ | 1.77 |
| Elongation at break ___percent__ | 650 |
| Modulus at 200% elongation ___kg./mm.$^2$__ | 0.27 |

In general, the concentration of the amorphous linear polymer in the chlorinated solvent may be from 1% to 20%, and chlorosulfonates which yield useful elastomers on vulcanisation are obtained by mixing the solution with from 8 parts to 50 parts percent by weight of the polymer of sulphuryl chloride and holding the solution at a temperature between 30° C. and 70° C. for from about one to about two hours. As is apparent from the examples, the chlorosulfonation can be facilitated by exposing the solution of the polymer containing the sulfuryl chloride and, optionally, a catalyst such as pyridine, to light during the reaction.

As noted hereinabove the starting linear polymers of the alpha-olefines having a substantially regular head-to-tail structure can be obtained by polymerizing the alpha-olefine with the aid of a catalyst resulting from the reaction of a compound of a transition metal of groups IV to VI of the periodic table with an organometallic compound of a metal from the 1st to 3rd groups of the periodic table. The polymerization can be effected in an inert hydrocarbon solvent, for example, at temperatures between 20° C. and 120° C. and at atmospheric or slightly increased pressure.

The transition metal compound consists of a compound or a mixture of compounds of a transition metal of groups IV to VI of the periodic table, for example a halide of titanium, zirconium, hafnium, thorium, vanadium, tantalum, niobium, chormium, molybdenum tungsten or uranium.

The organometallic compound comprises a substance or mixture of substances selected from the group consisting of simple and complex compounds the molecules of which contain as a central atom a metal from the group forming the 1st to 3rd columns of the periodic table, for example, lithium, beryllium, magnesium, zinc, cadmium, aluminum, and so on.

The valences of the aforesaid metal are linked to the same or different alkyl radicals containing 2 to 16 carbon atoms. When metals with valence higher than 1 are used, one valence of the metal may be satisfied by halogen or an alkoxy radical containing 2 to 4 carbon atoms. Typical organometallic compounds which may be reacted with the transition metal compound to produce the new catalysts include triethyl aluminum, diethyl zinc, diethyl aluminum monochloride.

The molar ratio of the transition metal compound to the organometallic compound is advantageously between 1:1 and 1:10.

The catalyst can be prepared in the presence of the alpha-olefine to be polymerized.

The polymerizates are, initially, mixtures of linear head-to-tail polymers having no branches longer than R, which mixtures comprise, essentially, amorphous and crystalline polymers which can be separated by fractional dissolution. Thus, after removal of some oily, low molecular weight products soluble in acetone and generally present in the polymerizate in only small amounts, there may be obtained, by successive extraction of the polymerizate with ether and n-heptane, semi-solid to solid amorphous polymers, solid, partially crystalline polymers of higher molecular weight, and highly crystalline polymers of very high molecular weight.

Both the amorphous and crystalline polymers are linear, as shown by their infra-red spectra.

The amorphous linear polymers of the alpha-olefines higher than propylene and which are extractable from the crude polymerizate with ether are the preferred starting materials for the production of the present elastomers.

The following are specific examples of the production of amorsphous polymers suitable for chlorosulfonation and subsequent vulcanization to produce the new elastomers.

(A) About 160 ml. of gasoline containing 5.7 gms. of triethyl aluminum and 85 gms. of alpha-butene (technical grade) are introduced into a 435 ml. autoclave. The autoclave is heated to 80° C. and 1.8 gms. of titanium tetrachloride dissolved in 35 ml. of gasoline are added. The temperature increases spontaneously to some degree. After about one hour, a further quantity of titanium tetrachloride dissolved in gasoline is added. A spontaneous temperature increase of about 10° C. occurs. The autoclave is agitated for some hours at 90° C. to 98° C. The catalyst is decomposed and all inorganic compounds resulting from such decomposition are removed by treating the crude product with methanol and hydrogen chloride, after which the crude polymerizate is filtered under suction and dried.

The solid polymer mixture can be separated into a small amount of oily, low molecular weight products and several larger fractions of amorphous and crystalline products by fractional dissolution using, successively, boiling acetone, ethyl ether and n-heptane. The fractionation can be conducted in an extractor of the Kumagawa type and the extraction with each solvent is continued until the percolating solvent does not contain any appreciable quantity of extracted polymer.

Proceeding in this manner, an ether extractable amorphous, linear, poly-alpha-butene suitable for the present purposes is obtained.

(B) About 25 gms. of alpha-hexene dissolved in 29 gms. of hexene containing 5.7 gms. of triethyl aluminum, are heated under reflux in a 500 ml. flask fitted with a stirrer, under nitrogen atmosphere. 1.8 gms. of titanium tetrachloride dissolved in hexane are then added and the mixture is allowed to boil under reflux for 5 hours. The solution thus obtained is treated, after cooling, with methanol, then with diluted hydrochloric acid, and finally evaporated to dryness.

After removal of any acetone-soluble low molecular weight portions, an amorphous, linear poly-alpha-hexene suitable for use in the present method of making elastomers is obtained by extraction of the product with ether.

Some changes may be made in practicing our invention, such as changes in the selection of the specific amorphous polymeric alpha-olefine higher than propylene which is treated, changes in the specific vulcanizing aids and other adjuvants compounded with the polymer, and so on without departing from our invention. It is to be understood, therefore, that we intend to claim as part of our invention any variations, substitutions and changes that lie within the scope of our invention and of the appended claims, and intend to include within the scope of said claims such changes as may be apparent to those skilled in the art in the practice of the principles of our invention.

What is claimed is:

1. Linear, substantially amorphous, head-to-tail high homopolymers of alpha-olefines having the formula $CH_2=CHR$ and containing from 4 to 6 carbon atoms, said polymers having hydrogen atoms substituted by Cl atoms and $SO_2Cl$ groups in a proportion such that the chlorine content of the substituted polymers is from 0.3% to about 10% by weight and the sulfur content is from 0.3% to 3.0% by weight.

2. Substituted linear, substantially amorphous high homopolymers according to claim 1, characterized in that the polymer is poly-alpha-butene.

3. Substituted linear, substantially amorphous high homopolymers according to claim 1, characterized in that the polymer is poly-alpha-n-pentene.

4. Substituted linear, substantially amorphous homopolymers according to claim 1, characterized in that the polymer is poly-alpha-n-hexene.

5. A process for preparing elastomers which comprises the steps of chlorosulfonating a substantially regular head-to-tail and linear, amorphous high homopolymer of an alpha-olefine of formula $CH_2=CHR$ and containing from 4 to 6 carbon atoms, in solution in a solvent for the polymer to thereby substitute hydrogen atoms of the polymer by Cl atoms and $SO_2Cl$ groups in a proportion such that the chlorine content of the substituted polymer is from 0.3% to about 10% by weight and the sulfur content is from 0.3% to 3.0% by weight, recovering the chlorosulfonated polymer, mixing a hydrogen chloride acceptor with the chlorosulfonated polymer, and cross-linking said polymer by heating the mixture at a temperature of 140° C. to 150° C.

6. The process according to claim 5, characterized in that the chlorosulfonating agent is sulfuryl chloride, and the chlorosulfonation is carried out in the presence of a catalyst consisting of a pyridine base, under the influence of light, and at a temperature between 30° C. and 70° C.

7. The process according to claim 5, characterized in that the chlorosulfonation is carried out by means of gaseous mixtures of sulfur dioxide and chlorine.

8. The process according to claim 5, characterized in that the chlorosulfonated polymer is cross-linked in the presence of substances which function as hydrochloric acid acceptors, said substances selected from the group consisting of lead oxide, amines and diamides.

9. The process according to claim 5, characterized in that the chlorinated solvent for the polymer is carbon tetrachloride.

10. A process for preparing elastomers which comprises the steps of chlorosulfonating a crude, substantially amorphous, linear, regular head-to-tail high molecular weight homopolymerizate of hexene, in a solution in a solvent for the polymerizate, to thereby substitute hydrogen atoms of the polymerizate by Cl atoms and $SO_2Cl$ groups in a proportion such that the chlorine content of the chlorosulfonated polymerizate is from 0.3% to about 10% by weight and the sulfur content is from 0.3% to 3.0% by weight, recovering the chlorosulfonated polymerizate, mixing the chlorosulfonated polymerizate with a hydrogen chloride acceptor, and cross-linking said polymerizate by heating the mixture at a temperature of 140° C. to 150° C.

11. A substantially saturated elastomer consisting essentially of a heat-cured, cross-linked chlorosulfonated substantially linear and amorphous regular head-to-tail high molecular weight homopolymer of an alpha-olefin having the formula $CH_2=CHR$ and containing from 4 to 6 carbon atoms, the combined chlorine content of the chlorosulfonated homopolymer being from 0.3% to about 10% by weight and the combined sulfur content being from 0.3% to 3.0% by weight.

12. A substantially saturated elastomer consisting essentially of a heat-cured, cross-linked chlorosulfonated, substantially linear and amorphous, regular head-to-tail poly(alpha-butene), having a combined chlorine content of from 0.3% to about 10% by weight and a combined sulfur content of from 0.3% to 3.0% by weight, said elastomer having an ultimate tensile strength above 0.5 kg./mm.² and an elongation above 500%.

13. A substantially saturated elastomer consisting essentially of a heat-cured, cross-linked chlorosulfonated substantially linear and amorphous, regular head-to-tail poly(alpha-n-pentene) having a combined chlorine content of from 0.3% to about 10% by weight and a combined sulfur content of 0.3% to 3.0% by weight, said elastomer having an ultimate tensile strength above 0.5 kg./mm.$^2$ and an elongation above 500%.

14. A substantially saturated elastomer consisting essentially of a heat-cured, cross-linked chlorosulfonated, substantially linear and amorphous, regular head-to-tail poly(alpha-hexene) having a combined chlorine content of 0.3% to about 10% by weight and a combined sulfur content of 0.3% to 3.0% by weight, said elastomer having an ultimate tensile strength above 0.5 kg./mm.$^2$ and an elongation above 500%.

References Cited in the file of this patent

UNITED STATES PATENTS

| | | |
|---|---|---|
| 2,405,971 | McAlvy | Aug. 20, 1946 |
| 2,691,647 | Field et al. | Oct. 12, 1954 |
| 2,726,231 | Field et al. | Dec. 6, 1955 |
| 2,824,089 | Peters et al. | Feb. 18, 1958 |
| 2,834,768 | Friedlander | May 13, 1958 |
| 2,840,551 | Field et al. | June 24, 1958 |
| 2,843,577 | Friedlander et al. | July 15, 1958 |
| 2,879,261 | Johnson et al. | Mar. 24, 1959 |

OTHER REFERENCES

Natta et al.: J. Am. Chem. Soc., 77, 1708–1710, March 1955.